US005969682A

United States Patent [19]

Ito et al.

[11] Patent Number: 5,969,682

[45] **Date of Patent: *Oct. 19, 1999**

[54] ANTENNA APPARATUS AND PORTABLE RADIO APPARATUS

[75] Inventors: Hiroki Ito, Kanagawa; Yoshiki Kanayama, Saitama, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,222

[22] Filed: Mar. 28, 1996

[30] Foreign Application Priority Data

Apr. 10, 1995 [JP] Japan ............................... P07-109107

[51] Int. Cl.$^{6}$ ....................................................... H01G 1/24

[52] U.S. Cl. .......................... 343/702; 343/791; 343/841; 343/895

[58] Field of Search .................................... 343/702, 841, 343/848, 895, 901, 790, 791; H01Q 1/24, 1/52

[56] References Cited

U.S. PATENT DOCUMENTS

| | | | |
|---|---|---|---|
| 2,599,944 | 6/1952 | Salisbury | 343/841 |
| 5,177,492 | 1/1993 | Tomura et al. | 343/901 |
| 5,335,366 | 8/1994 | Daniels | 343/702 |
| 5,440,317 | 8/1995 | Jalloul et al. | 343/791 |
| 5,446,469 | 8/1995 | Makino | 343/702 |
| 5,507,012 | 4/1996 | Luxon et al. | 343/702 X |
| 5,550,552 | 8/1996 | Oxley | 343/702 |

*Primary Examiner*—Don Wong
*Assistant Examiner*—Tho Phan
*Attorney, Agent, or Firm*—Jay H. Maioli

[57] ABSTRACT

An antenna apparatus for use in a portable cellular telephone that can avoid deterioration in signal radiation characteristics caused by the adverse influence of a user's head during the use of the telephone. Two sleeves have been fixed to a housing for a portable cellular telephone. A linear radiating conductor having a λ/4-electrical length is slidably supported by the housing by way of the two sleeves so that it can be both freely pulled out of or accommodated in the housing. The radiating conductor is extended at one end on the side of the power-feed point by a length equivalent to nλ/2. Also, a tubular conductor is coaxially disposed with the extended portion so as to form a power-feed coaxial line. When the radiating conductor is pulled out of the housing to such a degree as to reveal the coaxial line, the monopole antenna projects sufficiently away from a user's head, and a deterioration in signal radiation characteristics can thus be prevented.

13 Claims, 9 Drawing Sheets

ANTENNA APPARATUS AND PORTABLE RADIO APPARATUS

BACKGROUND OF THE INVENTION

1. Field of the Invention

The present invention relates to an antenna apparatus and a portable radio apparatus suitable for, for example, portable cellular telephones.

2. Description of the Related Art

In a typical conventional portable cellular telephone, as illustrated in FIG. 1, openings 12*h* and 13*h* for a receiver (speaker) and a transmitter (microphone), respectively, are provided on the front surface 10*f* of a telephone housing 10. Also, disposed on the front surface 10*f* are dial keys 14 and various types of function control keys 15. A liquid crystal display 16 is further located at the central portion of the front surface 10*f*.

An arcuate projection 10*c* is formed on the upper left end of the housing 10 so that the housing 10 can be prevented from be dropped during use. A function-controlling operational knob 17 is disposed in the vicinity of the projection 10*c*. The user holds the housing 10 with his/her left hand and moves the peripheral end of the knob 17 upward or downward with the thumb so as to rotate the knob 17 clockwise or counterclockwise. A flexible monopole antenna, a so called whip antenna 18, having a length equal to one fourth of the wavelength λ of the transmitting and receiving frequency, is mounted on the top surface 10*t* of the housing 10 in such a manner that it can be accommodated in the housing 10. The whip antenna 18 can be pulled out of the housing 10 to use the cellular telephone.

However, when the whip antenna 18 is accommodated within the housing 10, the input impedance increases, since the whip antenna is located near a ground conductor. It is thus difficult to achieve impedance matching. The increased input impedance seriously decreases the antenna gain due to impedance mismatching.

One of the measures to improve the antenna gain when the movable whip antenna is stored within the housing is to use a top-load whip antenna obtained by directly connecting a helical antenna having an electrical length substantially equivalent to one fourth of the wavelength (λ/4) to the forward end of a monopole antenna. In this type of antenna, when the whip antenna is pulled out of the housing, power is supplied to the base end of the whip antenna through a fixed feeder contact point so that it is operable as a single antenna formed of a combination of the helical portion and the monopole portion. When the whip antenna is accommodated within the housing, on the other hand, power is supplied to the forward end of the antenna to principally operate the helical portion, thereby obtaining a satisfactory level of the gain.

When the top-load whip antenna constructed as described above is stored in the housing, the monopole portion, which does not contribute to radiation, disadvantageously serves as an open stub, which produces an adverse influence on the input impedance of the antenna, thereby disturbing the impedance matching. An undesired electrical connection is also caused between the monopole portion and a high-frequency circuit.

To further overcome the drawbacks caused when the above type of top-load whip antenna is stored within the housing, another type of antenna has come into use: that is, a composite antenna in which the helical portion and the monopole portion are mechanically connected but electrically separated from each other when accommodated within the housing.

An example of a conventional complex antenna construction will now be explained with reference to FIGS. 2 and 3. A tubular antenna-mounting sleeve 101 is attached to a synthetic-resin-formed housing 10 for a portable radio by such means as insert-molding. A tubular antenna-supporting sleeve 102 is fit into the sleeve 101 by such means as a screw thread. A circuit board (printed board) 21 is arranged within the housing 10. Mounted on the circuit board 21 are the circuits required for this portable telephone, such as a transmitting circuit (receiving circuit) represented by a signal source 22, a matching circuit 23, and the like. A power-feed spring 24 is connected to the matching circuit 23 and is also in contact with the antenna-mounting sleeve 101.

The composite antenna apparatus comprises a helical antenna structure 30 and a monopole (whip) antenna structure 40. The helical antenna structure 30 is largely formed of a helical conductor 31 having a substantially λ/4 electrical length. The conductor 31 is wound at one end around the top portion of a support conductor 32 having a T-shaped cross section, and is completely stored in the longitudinal direction in a protective casing 33 formed of a required insulating material. The monopole antenna structure 40 is also primarily formed of a linear conductor 41 having a substantially λ/4 electrical length. The overall structure 40 is substantially covered with an appropriate dielectric layer 42 in the longitudinal direction. The conductor 41 is mechanically connected at its top end to a tubular separator 51 formed of a required insulating material. The conductor 41 is connected at its bottom end to a tubular support conductor 43. A larger stopper sleeve 44 is further coupled to the bottom end of the support conductor 43.

The top end of the separator 51 of the monopole antenna structure 40 is mechanically coupled to the bottom end of the support conductor 32 of the helical antenna structure 30, whereby the helical antenna structure 30 and the monopole antenna structure 40 can be mechanically integrated to each other.

The diameters of the support conductors 32 and 43 of the helical antenna structure 30 and the monopole antenna structure 40, respectively, are set to equal the internal diameter of the antenna-supporting sleeve 102. The support conductors 32 and 43 are slidably held by the sleeve 102. With this construction, as illustrated in FIG. 2, when the linear conductor 41 is pulled out of the housing 10, the support conductor 43 of the monopole antenna structure 40 becomes engaged with the supporting sleeve 102 so as to supply power to the conductor 41 from the signal source 22 through the matching circuit 23, the power-feed spring 24 and the sleeve 101 whereby the linear conductor 41 can serve as a radiating conductor.

On the other hand, as shown in FIG. 3, when the conductor 41 is stored within the housing 10, the support conductor 32 of the helical antenna structure 30 comes into contact with the supporting sleeve 102 so that power can be supplied to the helical conductor 31 from the signal source 22 in a manner similar to the operation described above. The helical conductor 31 can thus function as a radiating conductor.

An explanation will further be given of another example of conventional composite antenna construction. In this example shown in FIGS. 4 and 5, the support conductor 32*r* of the helical antenna structure 30 is formed in a ring-like shape and mounted on the top ends of the sleeve 101 and the supporting sleeve 102 of the housing 10 across a spacer 103 formed of an insulating material. The helical antenna structure 30 can thus be secured to the housing 10. An opening 33*o* is provided in the top surface of the protective casing 33. On the other hand, a tubular connecting conductor 52 is coupled to the top end of the separator 51 connected to the top end of the conductor 41 of the monopole antenna structure 40. A member 53 doubling as a stopper and a knob formed of a required insulating material and having a T-shaped cross section is further coupled to the top end of the connecting conductor 52.

The diameters of the support conductor 43 of the monopole antenna structure 40 and the connecting conductor 52 are determined to be equal to the internal diameter of the antenna-supporting sleeve 102. The support conductor 43 and the connecting conductor 52 are slidably held by the sleeve 102.

One end of the monopole antenna structure 40 is inserted into the protective casing 33 of the helical antenna structure 30 through the opening 33*o* so that it can be disposed coaxially with the helical antenna structure 30 while being mechanically independent. The other elements of the apparatus are constructed in a manner similar to those shown in FIGS. 2 and 3.

Accordingly, as shown in FIG. 4, when the linear conductor 41 is withdrawn from the housing 10, the support conductor 43 of the monopole antenna structure 40 is brought into contact with the support sleeve 102. This allows power to be supplied to the conductor 41 from the signal source 22 through the matching circuit 23, the power-feed spring 24 and the antenna-mounting sleeve 101, whereby the conductor 41 can serve as a radiating conductor. In contrast, as illustrated in FIG. 5, when the conductor 41 is stored within the housing 10, the support conductor 32*r* of the helical antenna structure 30 becomes engaged with the supporting sleeve 102 across the connecting conductor 52. Thus, power is supplied to the helical conductor 31 from the signal source 22 through the matching circuit 23, the power-feed spring 24 and the sleeves 101 and 102 so that the conductor 31 can function as a radiating conductor.

In the field of mobile communications, the number of available frequencies is decreasing due to improvements in the quality of communications and an increase in the capacity of lines. This necessitates the use of a frequency band exceeding 1 GHz. In response to such a high-frequency band, for example, 1.9 GHz, the length of the above-described monopole antenna having a $\lambda/4$-electrical length is required to be about 4 cm. Even though it is pulled out of a cellular telephone, such a short monopole antenna is too short to project sufficiently away from a user's body, in particular, the user's head. This adversely affects the radiation characteristics of the antenna, such as a resulting decrease in the antenna gain. Further, the $\lambda/4$-electrical-length helical antenna has a shorter axial length than the monopole antenna. The above-described adverse influence caused by a user's head is thus accentuated, thereby further reducing antenna radiation characteristics to a greater level.

SUMMARY OF THE INVENTION

Accordingly, it is an object of the present invention to provide an antenna apparatus and a portable radio apparatus, both of which can avoid a deterioration in antenna radiation characteristics caused by the adverse influence of a user's head during the use of the portable radio apparatus.

In order to achieve the above object, according to a first aspect of the present invention, there is provided an antenna apparatus comprising: a linear conductor including a portion having a predetermined length and an extended portion extending from the portion having the predetermined length; and a tubular conductor insulated from the linear conductor and covering the extended portion.

According to a second aspect of the present invention, there is provided a portable radio apparatus comprising: a housing; an antenna comprising (i) a linear conductor that includes a portion having a predetermined length and an extended portion extending from the portion having the predetermined length and (ii) a tubular conductor insulated from the linear conductor and covering the extended portion; reference-potential supply means for supplying the reference potential to the tubular conductor of the antenna; and electric-circuit means being electrically connected to the linear conductor at one end of the extended portion of the antenna.

According to a third aspect of the present invention, there is provided an antenna apparatus comprising: a housing; first and second connecting conductors being attached to the housing in such a manner that they are insulated from each other; and an antenna being slidably attached to the housing, comprising (i) a linear conductor that includes a portion having a predetermined length and an extended portion extending from the portion having the predetermined length, (ii) an end conductor connected to one end of the linear conductor adjacent to the extended portion, and (iii) a tubular conductor insulated from the end conductor, also insulated from the linear conductor and covering the extended portion, wherein the tubular conductor and the end conductor are engageable with the first and second connecting conductors, respectively, when the antenna is pulled out of the housing.

According to a fourth aspect of the present invention, there is provided a portable radio apparatus comprising: a housing; first and second connecting conductors being attached to the housing in such a manner that they are insulated from each other; an antenna being slidably attached to the housing, comprising (i) a linear conductor that includes a portion having a predetermined length and an extended portion extending from the portion having the predetermined length, (ii) an end conductor connected to one end of the linear conductor adjacent to the extended portion, and (iii) a tubular conductor insulated from the end conductor, also insulated from the linear conductor and covering the extended portion; reference-potential supply means for supplying the reference potential to the tubular conductor of the antenna; and electric-circuit means being electrically connected to the end conductor of the antenna, wherein the tubular conductor and the end conductor are engageable with the first and second connecting conductors, respectively, when the antenna is pulled out of the housing.

With the above arrangement, the extended portion of the linear radiating conductor and the tubular conductor constitute a coaxial power-feed line. When the radiating conductor is pulled out of the housing to such a degree as to reveal the coaxial line, it can project away from the housing by the length equal that of the coaxial line.

DESCRIPTION OF THE PREFERRED EMBODIMENTS

A description will now be given of an embodiment of an antenna apparatus and a portable radio apparatus according to the present invention with reference to FIGS. 6 and 7.

Figure 1:
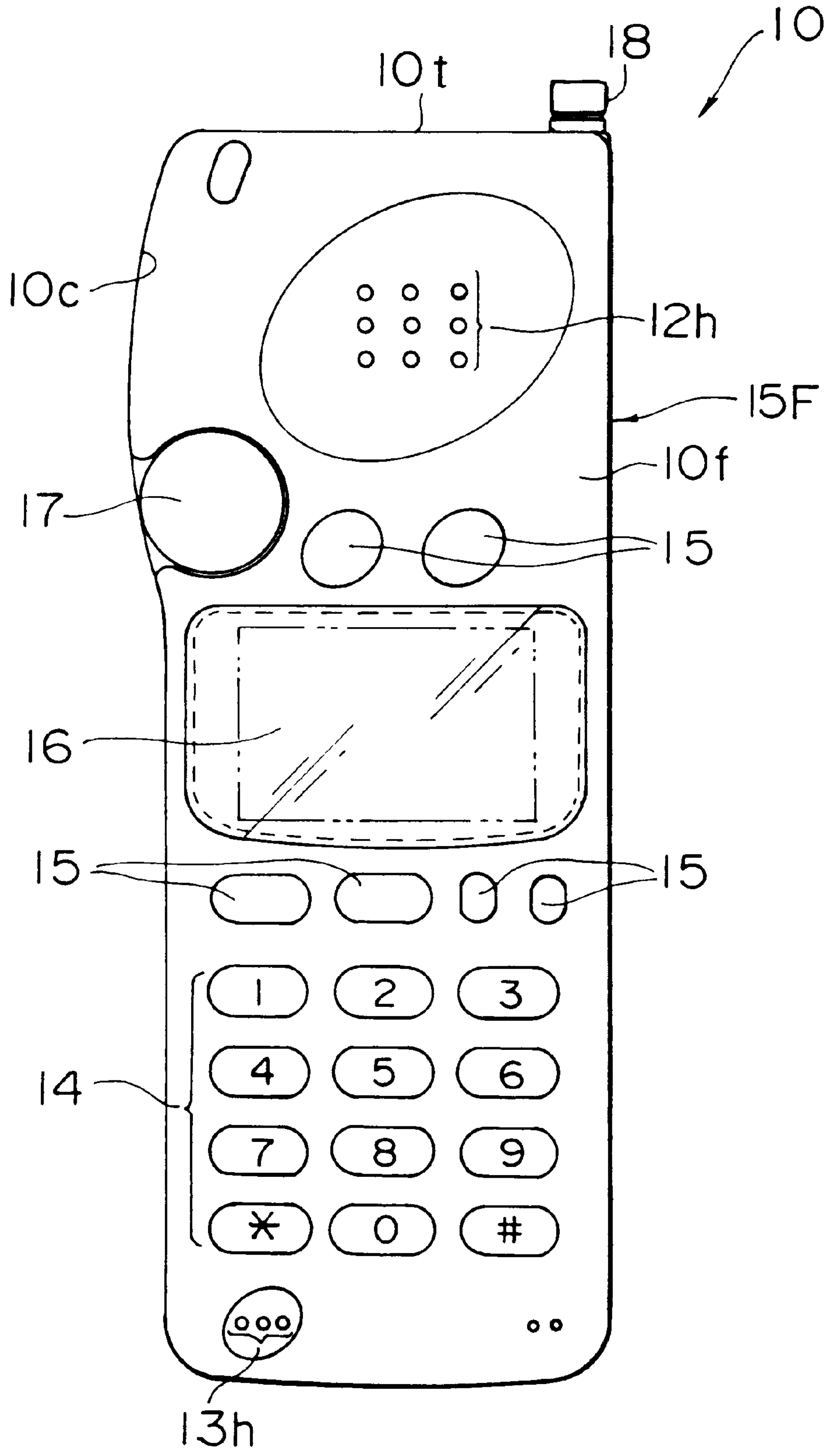
FIG. 1 is an elevational view illustrating the present invention.
Figure 2:
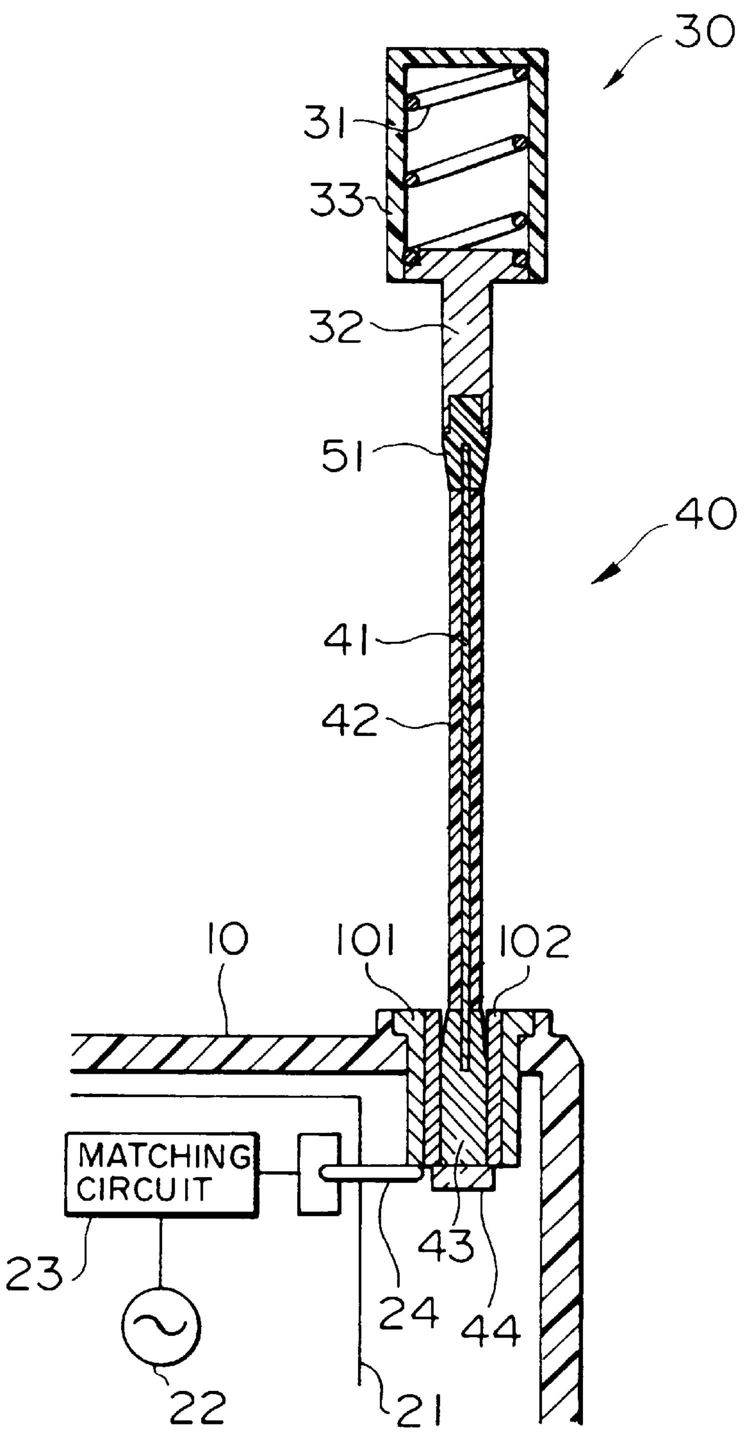
FIG. 2 (PRIOR ART)
FIG. 2 is a sectional view of an example of a conventional antenna.
Figure 3:
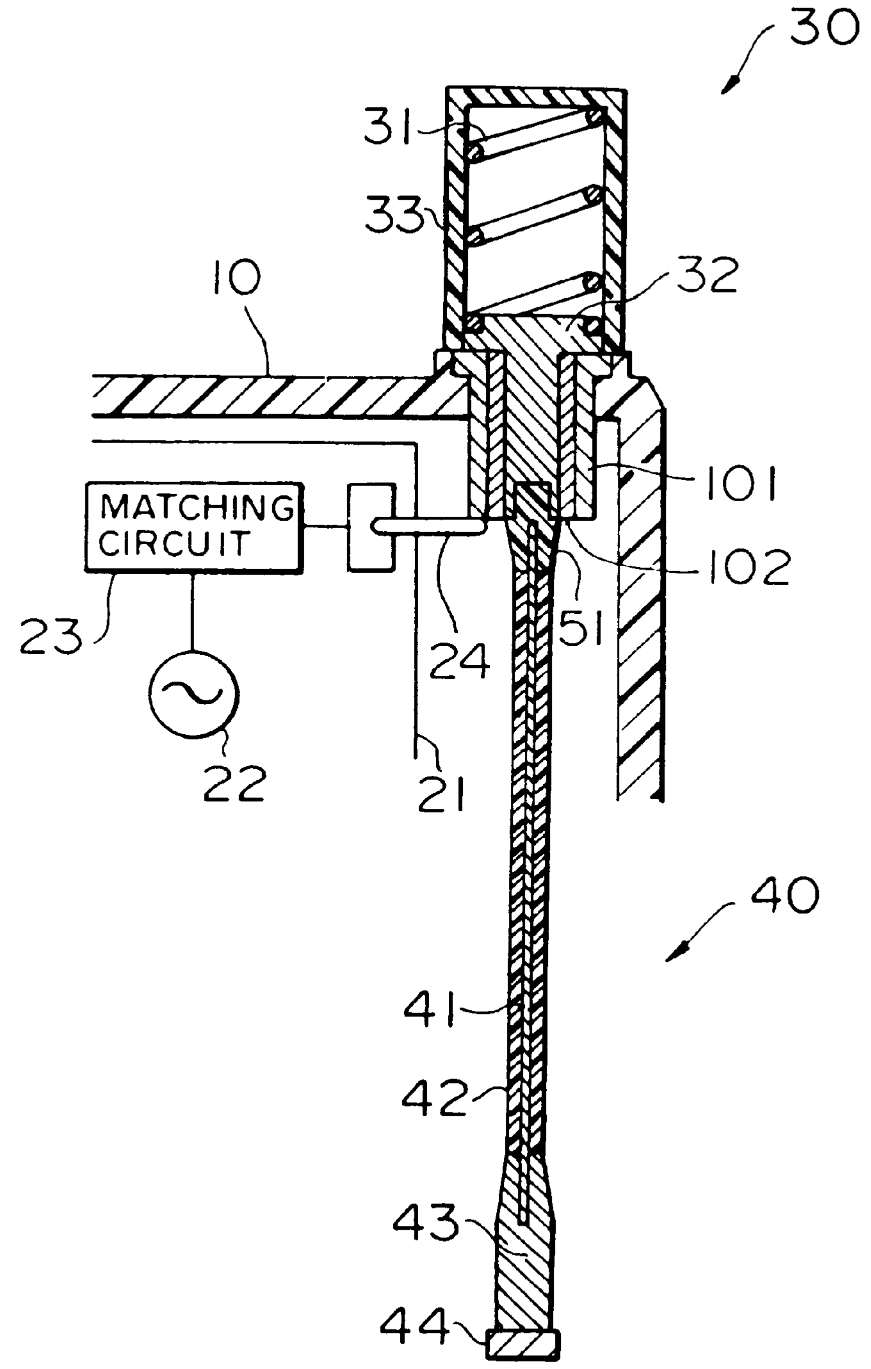
FIG. 3 (PRIOR ART)
FIG. 3 is a sectional view illustrating the operation of the conventional antenna shown in FIG. 2.
Figure 4:
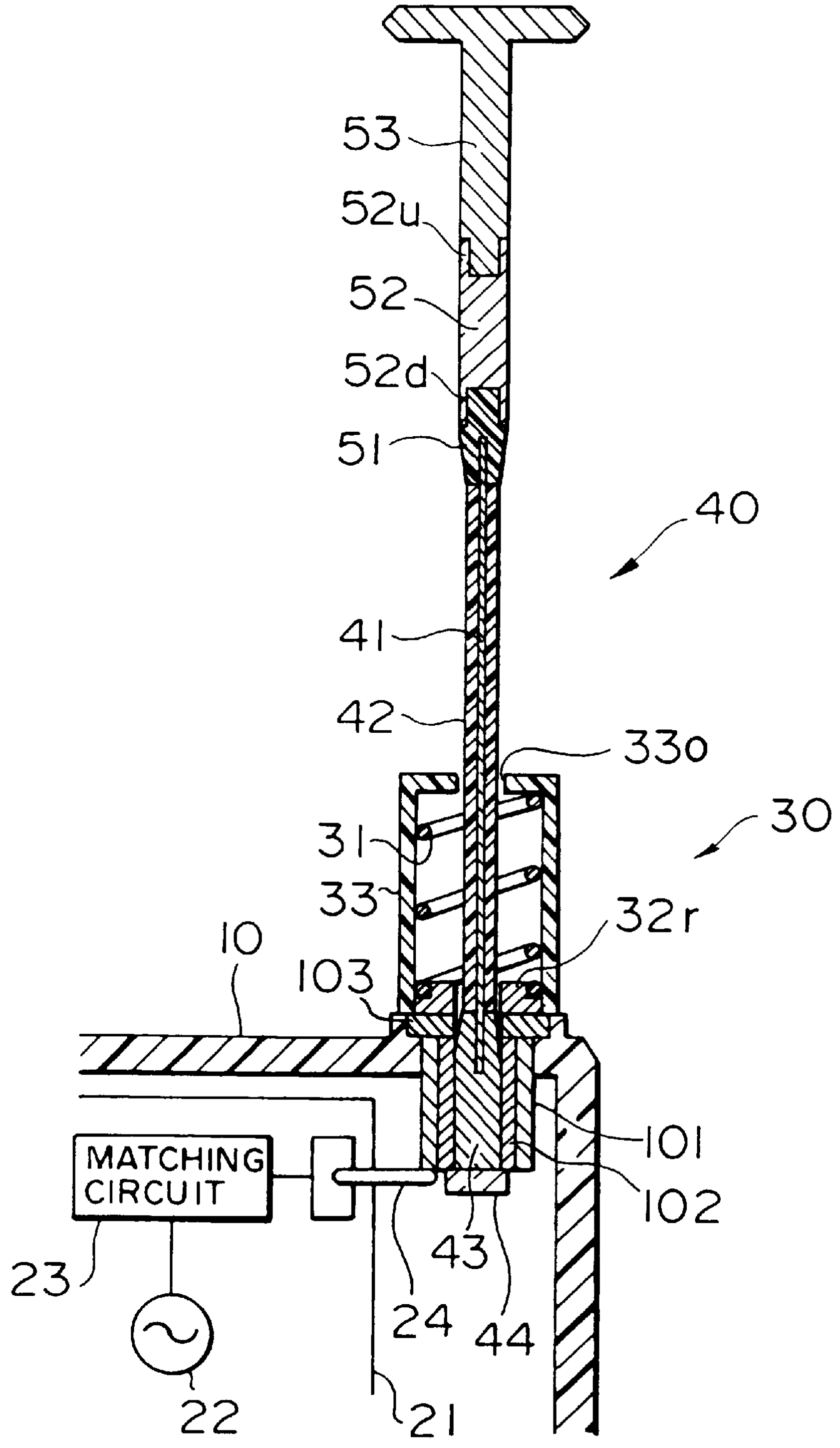
FIG. 4 (PRIOR ART)
FIG. 4 is a sectional view of another example of a conventional antenna.
Figure 5:
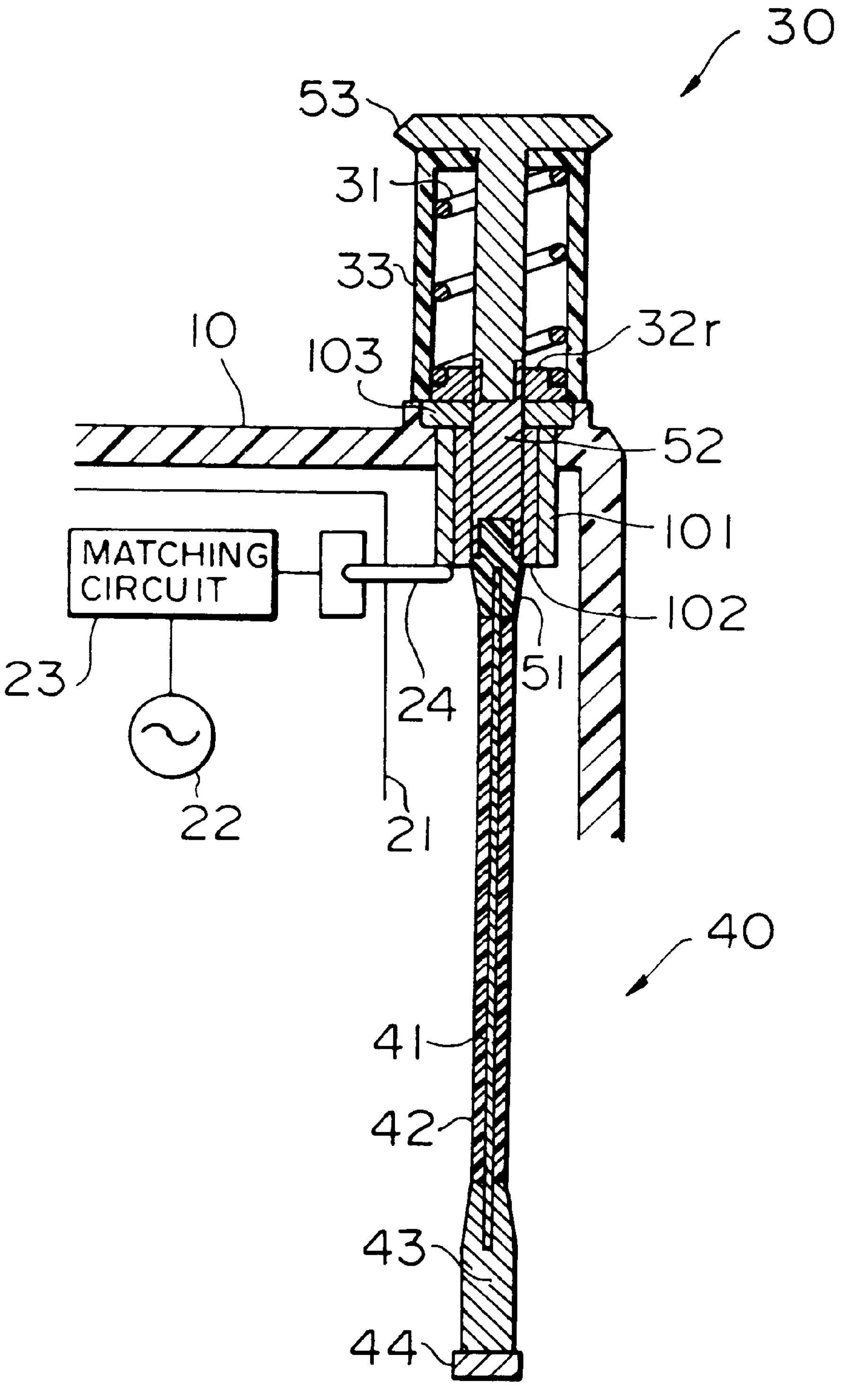
FIG. 5 (PRIOR ART)
FIG. 5 is a sectional view illustrating the operation of the conventional antenna shown in FIG. 4.
Figure 6:
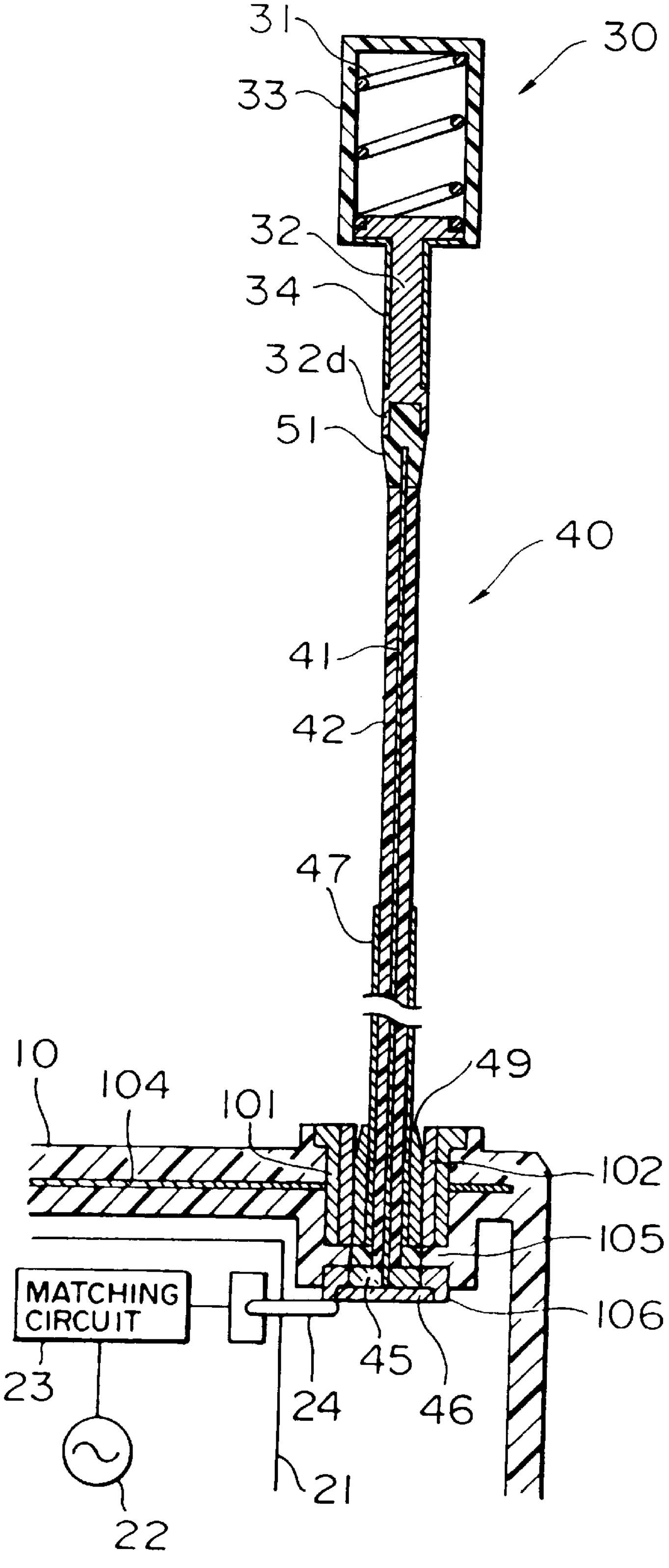
FIG. 6 is a sectional view of the construction according to an embodiment of the present invention.
Figure 7:
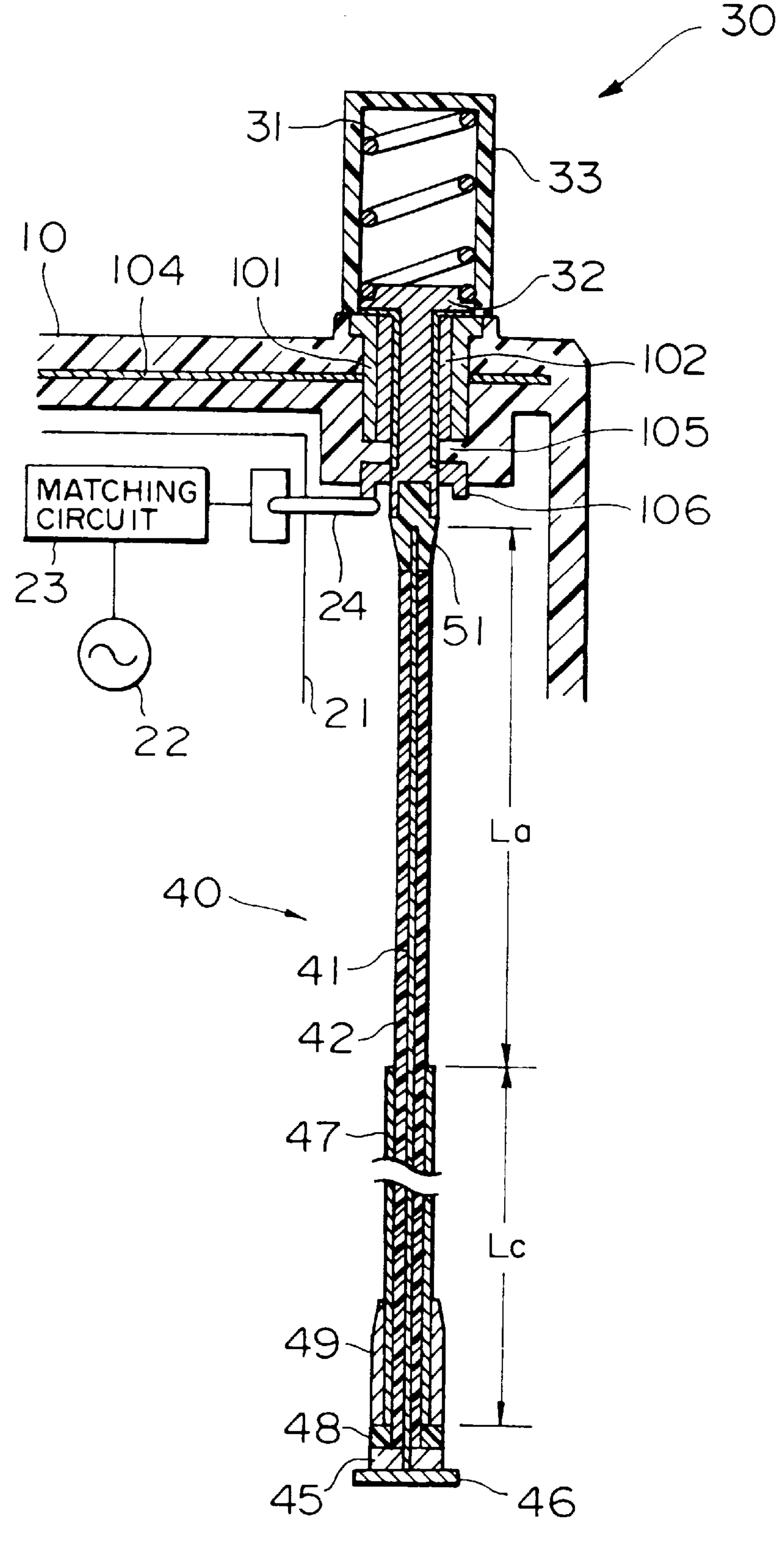
FIG. 7 is a sectional view illustrating the operation of the embodiment shown in FIG. 6.

The construction of this embodiment is shown in FIGS. 6 and 7. The same elements corresponding to those shown in FIGS. 2 and 3 are designated by the same reference numerals. Referring to FIGS. 6 and 7, the portable radio apparatus includes a synthetic-resin-formed housing 10 for a portable radio. A tubular antenna-mounting sleeve 101 is attached to the housing 10 by such means as insert-molding. An antenna-supporting sleeve 102 is further fit into the sleeve 101 by such means as a screw thread. In this embodiment, a ground conductor 104 is electrically connected to the sleeve 101, with both elements being embedded into the housing 10. Also, a ring-like connecting conductor 106 is fixed to the housing 10 farther inward so as to face the sleeve 101 across a separator 105. A circuit board (printed board) 21 is accommodated within the housing 10. Mounted on the circuit board 21 are the circuits required for the antenna apparatus, such as a transmitting circuit (and a receiving circuit) represented by a signal source 22, a matching circuit 23 and the like. A power-feed spring 24 is connected to the matching circuit 23 and is also in contact with the connecting conductor 106.

The helical antenna structure 30 of this embodiment is largely comprised of a helical conductor 31 having a substantially λ/4-electrical length. The conductor 31 is wound at one end around the top end of a support conductor 32 having a T-shaped cross section and is completely stored in the longitudinal direction in a protective casing 33 formed of a required insulating material. The outer surface of the support conductor 32 is covered with an insulating layer 34 having an L-shaped cross section so that only the bottom end 32*d* of the support conductor 32 is exposed.

In the monopole antenna structure 40 of this embodiment, as shown in FIG. 7, a linear conductor 41 having a length L*a* (having a substantially λ/4-electrical length) is extended by a length L*c* (having an electrical length equivalent to an integral multiple of the λ/2 wavelength). The entire conductor 41 is covered with a required dielectric layer 42. An inner support conductor 45 and a stopper conductor 46, both of which are formed in the shape of a disk, are attached to the bottom end of the conductor 41. A tubular conductor 47 partially covers the dielectric layer 42 over a length of L*c* and forms a coaxial line together with the conductor 41. The tubular conductor 47 is partially coated with an outer tubular support conductor 49 that is separated from the inner support conductor 45 across a spacer 48.

The top end of the conductor 41 is mechanically coupled to a tubular separator 51 formed of a required insulating material. The top end of the separator 51 is mechanically connected to the bottom end of the support conductor 32, whereby the helical antenna structure 30 and the monopole antenna structure 40 can be mechanically integrated to each other.

The external diameters of the bottom end 32*d* of the support conductor 32 and the insulating layer 34 provided for the helical antenna structure 30 and the external diameters of the support conductor 49 and the spacer 48 provided for the monopole antenna structure 40 are set to equal the internal diameter of the antenna-supporting sleeve 102. The former elements are slidably held by the sleeve 102. The external diameter of the stopper conductor 46 is determined to be equivalent to the internal diameter of the connecting conductor 106. The stopper conductor 46 is slidably supported by the connecting conductor 106.

With this configuration, as illustrated in FIG. 7, when the conductor 41 is accommodated within the housing 10, the bottom end 32*d* of the support conductor 32 provided for the helical antenna structure 30 comes into contact with the connecting conductor 106. Power is thus fed to the helical conductor 31 from the signal source 22 through the matching circuit 23, the power-feed spring 24, the connecting conductor 106 and the support conductor 32. This enables the helical conductor 31 to serve as a radiating conductor.

In contrast, as shown in FIG. 6, when the conductor 41 is pulled out of the housing 10, the outer support conductor 49 of the monopole antenna structure 40 is engaged with the supporting sleeve 102 so as to cause the tubular conductor 47 to be grounded. Also, the inner support conductor 45 is engaged with the connecting conductor 106 so as to allow power to be supplied to the conductor 41 from the signal source 22 through the matching circuit 23, the power-feed spring 24, the connecting conductor 106 and the conductors 45 and 46. Hence, the exposed portion projecting from the tubular conductor 47 forming the coaxial line with the conductor 41 can function as a radiating conductor. FIG. 6 clearly shows that the exposed portion of the conductor 41 projecting from the tubular conductor 47 extends away from the housing 10 by substantially the length L*c* of the conductor 47 (having an electrical length equivalent to an integral multiple of the λ/2 wavelength). This can prevent a deterioration in the radiation characteristics of the antenna caused by the adverse influences of a user's head during the use of a cellular telephone, unlike conventional apparatuses.

A description will now be given of another embodiment of the present invention with reference to FIGS. 8 and 9.

Figure 8:
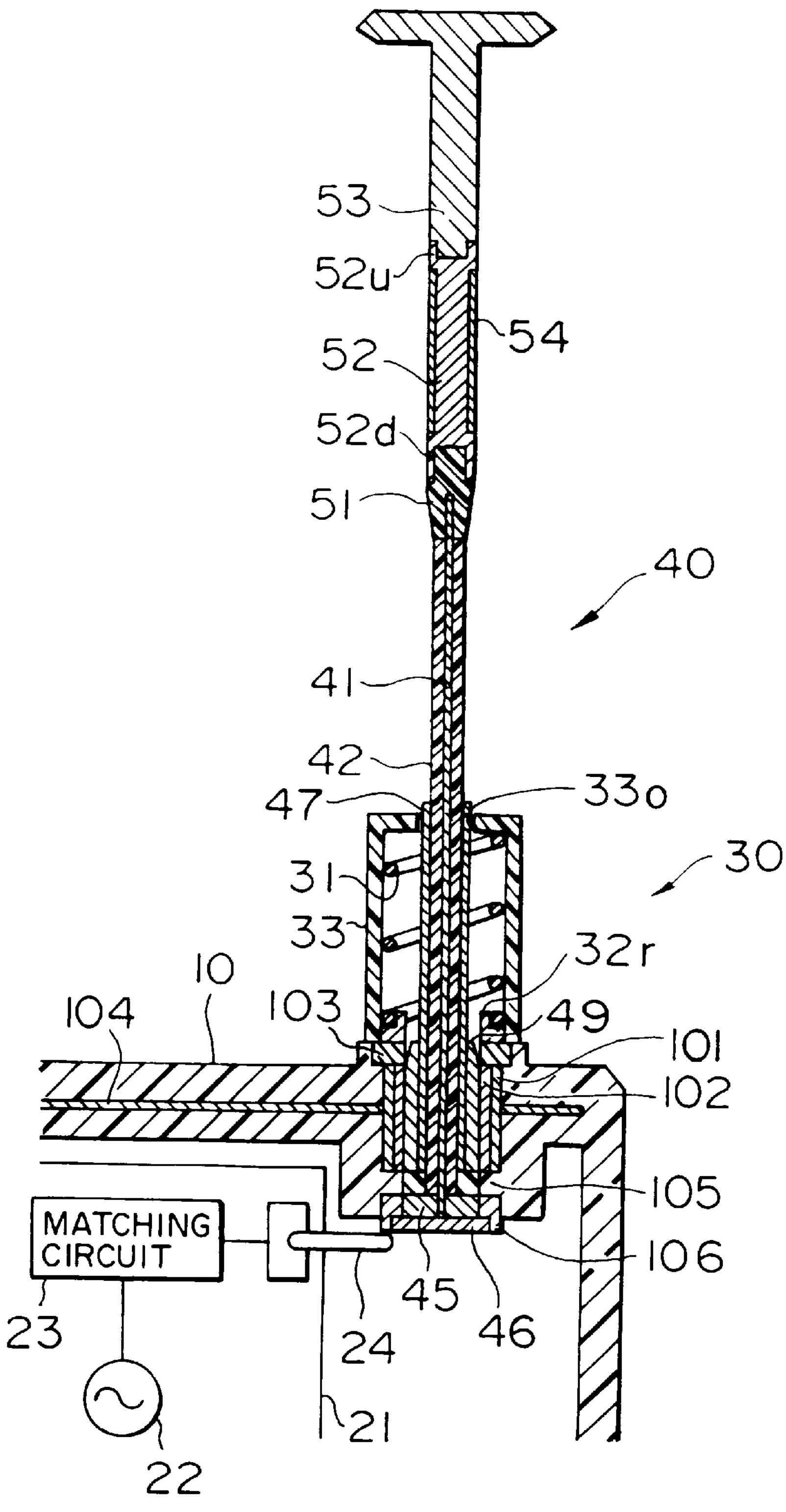
FIG. 8 is a sectional view of the construction according to another embodiment of the present invention.

FIG. 8 illustrates the layout of another embodiment of the present invention. The same elements as those shown in FIGS. 4 to 7 are designated by the same reference numerals, and an explanation thereof will thus be partially omitted. In this embodiment, as well as the previous embodiment, a tubular antenna-mounting sleeve 101 and a ground conductor 104, which are electrically connected to each other, are embedded into the housing 10. A tubular antenna-mounting sleeve 102 is fit into the mounting sleeve 101. A ring-like connecting conductor 106 is fixed to the housing 10 farther inward in such a manner that it can face the sleeve 101 across a separator 105.

A ring-like support conductor 32*r* wound around one end of the helical conductor 31 having a substantially λ/4-electrical length is mounted on the top surfaces of the mounting sleeve 101 and the supporting sleeve 102 provided for the housing 10 across a spacer 103. The helical antenna structure 30 can thus be fixed to the housing 10. Also, an opening 33*o* is provided in the top surface of the protective casing 33.

Figure 9:
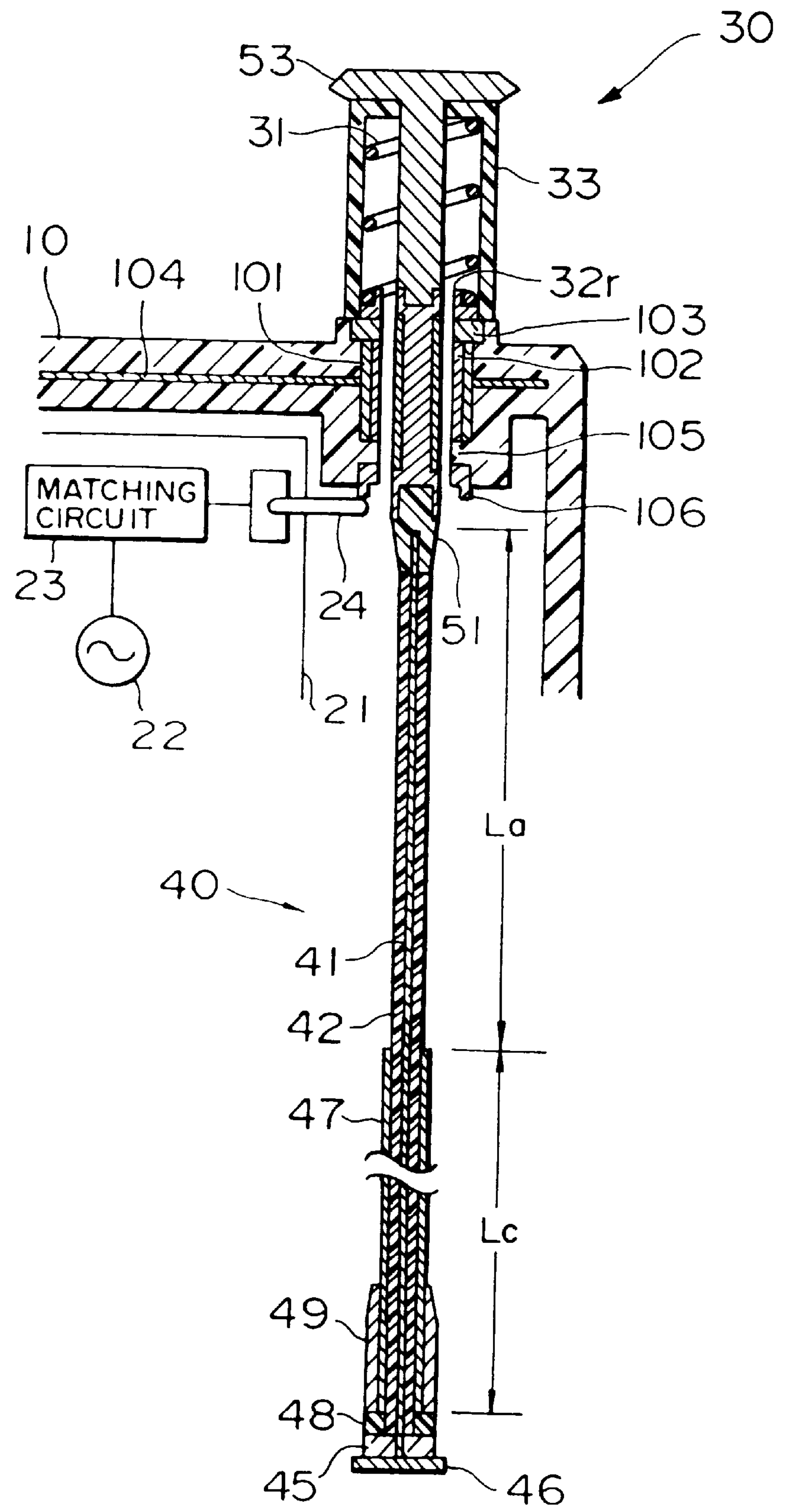
FIG. 9 is a sectional view illustrating the operation of the embodiment shown in FIG. 8.

In the monopole antenna structure 40, on the other hand, as illustrated in FIG. 9, a linear conductor 41 having a length of L*a* (having a substantially λ/4-electrical length) is extended by a length L*c* (having an electrical length equivalent to an integral multiple of the λ/2 wavelength). The entire conductor 41 is substantially covered with a required dielectric layer 42 in the longitudinal direction. An inner support conductor 45 and a stopper conductor 46, both of which are formed in the shape of a disk, are attached to the bottom end of the conductor 41. A tubular conductor 47, partially covering the dielectric layer 42 over the length L*c*, constitutes a coaxial line together with the conductor 41. The tubular conductor 47 is partially covered with a tubular external support conductor 49 that is separated from the internal support conductor 45 across a spacer 48.

A tubular connecting conductor 52 is coupled to the top end of the separator 51 connected to the top end of the conductor 41 of the monopole antenna structure 40. Mounted on the top end of the connecting conductor 52 is a member 53 doubling as a stopper and a knob formed of a required insulating material and having a T-shaped cross section. Moreover, the outer peripheral surface of the connecting conductor 52 is covered with a tubular insulating layer 54 so that only the top and bottom ends 52*u* and 52*d* of the conductor 52 can be exposed.

The external diameters of the support conductor 49 of the monopole antenna structure 40, the spacer 48, the top and bottom ends 52*u* and 52*d* of the connecting conductor 52, and the insulating layer 54 are set to equal the internal diameter of the antenna-supporting sleeve 102. The former elements are slidably held by the sleeve 102. The external diameter of the stopper conductor 46 is determined to be equivalent to the internal diameter of the connecting conductor 106. The conductor 46 is also slidably supported by the conductor 106.

The monopole antenna structure 40 is inserted into the protective casing 33 of the helical antenna structure 30 through the opening 33*o* and is coaxially located with the helical antenna structure 30 while being mechanically independent.

Accordingly, when the conductor 41 is stored within the housing 10, as shown in FIG. 9, the support conductor 32*r* of the helical antenna structure 30 is engaged with the top end 52*u* of the connecting conductor 52, and also, the bottom end 52*d* of the connecting conductor 52 comes into contact with the connecting conductor 106. This allows power to be fed to the helical conductor 31 from the signal source 22 through the matching circuit 23, the power-feed spring 24 and the connecting conductors 106 and 52. The helical conductor 31 can thus serve as a radiating conductor.

In contrast, when the conductor 41 is pulled out of the housing 10, as shown in FIG. 8, the outer support conductor 49 of the monopole antenna structure 40 becomes engaged with the supporting sleeve 102 to cause the tubular conductor 47 to be grounded. Also, the inner support conductor 45 is brought into contact with the connecting conductor 106 so as to allow power to flow to the conductor 41 from the signal source 22 through the matching circuit 23, the power-feed spring 24, the connecting conductor 106 and the conductors 45 and 46. This further enables the exposed portion of the conductor 41 projecting from the tubular conductor 47 forming the coaxial line with the conductor 41 to function as a radiating conductor.

FIG. 8 clearly indicates that the exposed portion of the conductor 41 projecting from the tubular conductor 47 can extend far away from the housing 10 by substantially the length L*c* of the conductor 47 (having an electrical length equivalent to an integral multiple of the λ/2 wavelength). This can avoid a degradation in the radiation characteristics of the antenna caused by the influence of a user's head during the use of a cellular telephone, unlike the conventional apparatus discussed above.

Although in the foregoing embodiments the conductor 41 of the monopole antenna structure 40 is formed of a simple line, it may be adapted to extend and contract in a plurality of stages depending on the space within the housing 10. Also, although in the above-described embodiments an uncovered conductor is formed in the shape of a densely-wound coil, an uncovered braided conductor may instead be used. In this case, the resulting tubular conductor is externally covered with an elastic insulating layer so that it can be flexible and be also provided with a restoring force to correct or prevent deformation caused by external forces. Further, although the electrical length of the antenna is determined to be the λ/4 wavelength, it may be the 3λ/8 or λ/2 wavelength, and in each case, similar advantages can be obtained.

As will be clearly understood from the foregoing description, the present invention offers the following advantages. One end of a linear radiating conductor having a predetermined electrical length (λ/4), which is slidably attached to the housing so that it can be freely pulled out of and accommodated in the housing, is extended by a predetermined length (nλ/2). A tubular conductor is coaxially disposed with this extended portion to form a coaxial power-feed line. When the radiating conductor is pulled out of the housing to such a degree as to reveal the coaxial line, therefore, the monopole antenna can extend sufficiently far away from a user's head during the use of a telephone, thereby avoiding a deterioration in radiation characteristics.

What is claimed is:

1. An antenna apparatus comprising:

a linear conductor including a first portion having a first physical length substantially equal to λ/4, where λ is the wavelength of a signal frequency of interest, and a second portion having a second physical length substantially equal to nλ/2, where n is an integer;

an insulator; and a rigid tubular conductor insulated from said linear conductor by said insulator and having a length substantially equal to said second physical length and being arranged coextensively with said second portion for covering only said second portion.

2. A portable radio apparatus comprising:

an antenna including (i) a linear conductor that includes a first portion having a first physical length substantially equal to λ/4, where λ is the wavelength of a signal frequency of interest, and a second portion having a second physical length substantially equal to nλ/2, where n is an integer, (ii) an insulator, and (iii) a rigid tubular conductor insulated from said linear conductor by said insulator and having a length substantially equal to said second physical length and being arranged coextensively with said second portion for covering only said second portion;

a housing having grounding means for grounding said rigid tubular conductor of said antenna; and electric-circuit means electrically connected to said linear conductor at one end of said second portion of said linear conductor of said antenna.

3. The portable radio apparatus according to claim 2, wherein said electric-circuit means comprises one of a transmitting circuit and a receiving circuit.

4. An antenna apparatus comprising:

a housing including grounding means;

first and second connecting conductors being attached to said housing so as to be electrically insulated from each other; and an antenna slidably attached to said housing, including (i) a linear conductor that includes a first portion having a first physical length substantially equal to λ/4, where λ is the wavelength of a signal frequency of interest, and a second portion having a second physical length substantially equal to nλ/2, where n is an integer, (ii) an end conductor connected to one end of said linear conductor on a side of said second portion, (iii) an insulator, and (iv) a rigid tubular conductor insulated from said end conductor and from said linear conductor by said insulator and having a length substantially equal to said second physical length and being arranged coextensively with said second portion for covering only said second portion, wherein said grounding means of said housing grounds said rigid tubular conductor, and said tubular conductor and said end conductor are engageable with said first and second connecting conductors, respectively, when said antenna is slidably pulled out of said housing.

5. A portable radio apparatus comprising:

a housing including grounding means;

first and second connecting conductors being attached to said housing so as to be electrically insulated from each other;

an antenna slidably attached to said housing, including (i) a linear conductor that includes a first portion having a first physical length substantially equal to λ/4, where λ is the wavelength of a signal frequency of interest, and a second portion having a second physical length substantially equal to nλ/2, where n is an integer, (ii) an end conductor connected to one end of said linear conductor on a side of said second portion, (iii) an insulator, and (iv) a rigid tubular conductor insulated from said end conductor and from said linear conductor by said insulator and having a length substantially equal to said second physical length and being arranged coextensively with said second portion for covering only said second portion; and electric-circuit means electrically connected to said end conductor of said antenna, wherein said grounding means of said housing grounds said rigid tubular conductor, and said tubular conductor and said end conductor are engageable with said first and second connecting conductors, respectively, when said antenna is slidably pulled out of said housing.

6. The portable radio apparatus according to claim 5, wherein said electric-circuit means comprises one of a transmitting circuit and a receiving circuit.

7. An antenna apparatus comprising:

a housing including grounding means;

first and second connecting conductors attached to said housing so as to be electrically insulated from each other;

a linear antenna slidably attached to said housing, including (i) a linear conductor that includes a first portion having a first physical length substantially equal to λ/4, where λ is the wavelength of a signal frequency of interest, and a second portion having a second physical length substantially equal to nλ/2, where n is an integer, (ii) an end conductor connected to one end of said linear conductor on a side of said second portion, (iii) an insulator, and (iv) a rigid tubular conductor insulated from said end conductor and from said linear conductor by said insulator and having a length substantially equal to said second physical length and being arranged coextensively with said second portion for covering only said second portion; and a helical antenna having a helical conductor insulated from said linear conductor of said linear antenna and coaxially disposed with said linear conductor, wherein said grounding means of said housing grounds said rigid tubular conductor, and said tubular conductor and said end conductor are engageable with said first and second connecting conductors, respectively, when said linear antenna is slidably pulled out of said housing, while said helical conductor is electrically connected to said second connecting conductor when said linear antenna is accommodated within said housing.

8. The antenna apparatus according to claim 7, wherein said helical antenna comprises a support conductor connected at one end to another end of said linear conductor of said linear antenna so as to be insulated therefrom and connected at another end to said helical conductor, said helical conductor being electrically connected to said second connecting conductor across said support conductor when said linear antenna is accommodated within said housing.

9. The antenna apparatus according to claim 7, wherein said helical antenna comprises a support conductor connected at one end to another end of said linear conductor of said linear antenna so as to be insulated therefrom, and said helical conductor is attached to said housing, said helical conductor being electrically connected to said second connecting conductor across said support conductor when said linear antenna is accommodated within said housing.

10. A portable radio apparatus comprising:

a housing including grounding means;

first and second connecting conductors attached to said housing so as to be electrically insulated from each other;

a linear antenna slidably attached to said housing, including (i) a linear conductor that includes a first portion having a first physical length substantially equal to λ/4, where λ is the wavelength of a signal frequency of interest, and a second portion having a second physical length substantially equal to nλ/2, where n is an integer, (ii) an end conductor connected to one end of said linear conductor on a side of said second portion, (iii) an insulator, and (iv) a rigid tubular conductor insulated from said end conductor and from said linear conductor by said insulator and having a length substantially equal to said second physical length and being arranged coextensively with said second portion for covering only said second portion;

a helical antenna having a helical conductor insulated from said linear conductor of said linear antenna and coaxially disposed with said linear conductor; and electric-circuit means electrically connected to said end conductor of said linear antenna, wherein said grounding means of said housing grounds said rigid tubular conductor, and said tubular conductor and said end conductor are engageable with said first and second connecting conductors, respectively, when said linear antenna is slidably pulled out of said housing, while said helical conductor is electrically connected to said second connecting conductor when said linear antenna is slidably accommodated within said housing.

11. The portable radio apparatus according to claim 10, wherein said electric-circuit means comprises one of a transmitting circuit and a receiving circuit.

12. The portable radio apparatus according to claim 10, wherein said helical antenna comprises a support conductor connected at one end to another end of said linear conductor of said linear antenna so as to be electrically insulated therefrom and at another end to said helical conductor, said helical conductor being electrically connected to said second connecting conductor across said support conductor when said linear antenna is slidably accommodated within said housing.

13. The portable radio apparatus according to claim 10, wherein said helical antenna comprises a support conductor connected at one end to another end of said linear conductor of said linear antenna so as to be electrically insulated therefrom, and said helical conductor is attached to said housing, said helical conductor being electrically connected to said second connecting conductor across said support conductor when said linear antenna is slidably accommodated within said housing.

* * * * *